Nov. 26, 1946. H. OLKEN 2,411,750
FOLLOW-UP CONTROL SYSTEM
Filed Sept. 12, 1941 2 Sheets-Sheet 1

Inventor
Hyman Olken
By John Howard Joynt
His Attorney

Inventor
Hyman Olken

Patented Nov. 26, 1946

2,411,750

UNITED STATES PATENT OFFICE 2,411,750

FOLLOW-UP CONTROL SYSTEM

Hyman Olken, Washington, D. C.

Application September 12, 1941, Serial No. 410,634

12 Claims. (Cl. 172—239)

This invention relates to control systems and more especially to regulating devices for control systems, wherein an indicator or sending instrument controls the position of a following unit or other receiving device.

Among the objects of my invention is the provision of an accurate and reliable following unit control system which enables the maintenance of close synchronization of movement of indicating and following units, which possesses greater mechanical simplicity, together with greater efficiency, than heretofore known control systems, which is economical to construct, requiring a minimum of expensive parts in its production, which is serviced readily without the assistance of a specially trained expert, and which accordingly is adapted for a wider range of application in the art of following unit control.

Other objects in part will be obvious and in part pointed out hereinafter.

The invention accordingly consists in the combination of elements, features of construction and arrangement of parts and in the several steps and the relation of each of the same to one or more of the others as described herein and shown in the accompanying drawings, the scope of the application of which is indicated in the following claims.

In the accompanying drawings illustrating certain features of my invention.

As conducive to a clearer understanding of my invention, it should be noted at this point that control systems of the type described broadly comprise an indicator, as for example, a galvanometer, a compass, a gun sight or a range finder, which is moved under very little power; and a servo arrangement to effect the high power driving of a following unit in response to displacement of the indicating element of the indicator. The following unit comprises, for example, a mount, a turret, a director or a recorder. The servo arrangement usually comprises a powerful motor, for driving the following unit, and a control, usually an amplifier, to run the motor a proper amount and in a proper direction to reduce to zero any deviation of the following unit from the indicating element.

A control system of the type described, when employed for controlling a gun mount, enables the automatic pointing of a gun in correspondence with the direction of a target, as indicated by a dial setting of a range finder or by a position of a gun sight. Other positioning type regulators are in use, such as those for positioning a cutting tool of a lathe in accordance with the position of a stylus following a templet; or for positioning a recorder pen in accordance with a galvanometer pointer indication. It will be understood that my invention applies to all applications of this type, but for purposes of illustration, the theory of gun mount control is stressed to some degree.

Naturally, a heavy following unit being driven under high power has high inertia and this inertia causes the following unit to overshoot a position signalled by the indicating element. Upon the following unit overshooting signalled position, a corrective action occurs wherein the following unit reverses to reduce its deviation from the indicating element. This process of overshooting, then reversing, commonly is termed "hunting." Often more than one overshoot and correction take place before the following unit comes to rest at proper position.

For most all applications of control systems of the type defined, particularly for gun pointing, it is desirable to eliminate overshooting and hunting of the following unit, or at least to reduce these factors to a tolerable minimum. It is known in the art that making the following unit motor speed decrease in direct proportion to deviation greatly reduces overshooting and hunting of the following unit. Also, it is known in the art that applying an "anticipating correction" to the following unit motor control system proportional to the rate of change of deviation between indicating element and following unit, that is, further slowing down the driving motor in proportion to the first time derivative of the deviation, will further reduce hunting and overshooting of the following unit. Still further, it is known that upon the application of an additional "anticipating correction," a second time derivative of deviation reduces, even more, overshooting and hunting of the following unit.

Where most refined control is desired, that is, where only negligible hunting of the following unit is permissible, it is conventional practice for reasons noted hereinbefore, to provide a control system wherein following unit motor speed is decreased in direct proportion to deviation, and wherein first and second time derivatives of deviation are applied further to damp the motor speed. To make such regulators effective, there must be very sensitive indication of the deviation. An amplifier is used in order to achieve such sensitive indication. Amplification frequently is accomplished by electrical means such as by the use of radio tubes, or by hydraulic means, or mechanically by step-up gearing as by using a 36-speed synchro. By amplifying the deviation by making speed of the following unit proportional to deviation, and applying first and second time derivative corrections to the motor control system, reduction of deviation to zero is permitted with negligible hunting or overshoot of the following unit. Amplification, however, spreads a small deviation into a wide operating range of the following unit motor controlling mechanism. Therefore, amplification restricts following unit control to a small range of deviation, hence to a small interval in the total operating range of the following unit.

In machines having extensive range of operation, such as a gun mount where range of train may be up to 360°, and possible deviation in train may vary through as much as 180°, it has become the practice to maintain sensitive precise control over the following unit or mount only for a small range of deviation of about 2½°. Very accurate first and second time derivative of deviation control, accordingly, is maintained over the following unit when the indicator and following unit are close together. When deviation extends beyond this range, a relay, for example, switches off the sensitive control mechanism and the motor of the following unit merely is turned full on, in proper direction, until deviation again decreases to 2½°, at which time the relay terminates full-on operation of the motor and brings into play the sensitive control mechanism.

Such an over-all method of control has the serious objection that the mechanism for deriving a second time derivative of deviation and superimposing it properly upon the first derivative correction, whether by electrical, mechanical or hydraulic means, makes for an intricate apparatus which is costly to manufacture, which gets out of order readily, and which requires specialized experts to understand and service it. Even more important is the fact that in machines where swings of the indicating element, hence deviations, are large, as in positioning an anti-aircraft gun, there is but hit-or-miss control of the gun over the greatest part of the range of movement. When gun and indicator or sight come very close together, that is, when deviation becomes small, there is a sudden switching and jumping over to precise first and second derivative control. If the overshoot extends beyond the fine control range, there is again a sudden switch-over back to full-on operation of the motor. This results not only in poor aiming of the gun, but the sudden transitions from full-on operation to sensitive control make it additionally difficult to provide smooth control over the movement of the gun.

One object of the present invention, therefore, is the provision of following unit control apparatus which ensures well damped asymptotic approach of the following unit to indicated position, which is adapted to apply one of two following unit speed corrections to the following unit motor depending on the degree of deviation between the following unit and indicating element, which for large deviations damps the following unit motor by the imposition of a velocity squared speed correction and which applies a time derivative of deviation correction to the motor for small deviations giving refined control to the motor and thus to the following unit as the following unit approaches indicated position.

Referring now more particularly to the practice of my invention, I provide a control system wherein movement of an indicator and a following unit are so synchronized that displacement of the indicator from a neutral position brings about proportional displacement of the following unit. In my control system, I provide means for starting the restoring motor in proper direction so as to reduce deviation to zero, when there is deviation; and means for shutting off the restoring motor when deviation is reduced to zero. I also employ the conventional practice of making the motor speed decrease proportionally as the deviation decreases, and of putting in, in addition, a first derivative correction for motor velocity.

I apply the first derivative correction over only a very small portion of the total operating range of my control system. A superimposed second derivative correction also may be present within this range, even though I attain good results without any such correction. This range is so small that with first derivative correction only, hunting, overshooting and residual deviation of the following unit are negligible.

Beyond that range, I apply no derivative correction of any kind, but a correction proportional to the square of the velocity of the following unit. This prevents storage of energy in the following unit on big swings in a manner linear with deviation. Consequently, as the deviation becomes small, the following unit has very little stored energy and can be stopped substantially at proper position by the first derivative correction control alone.

For switching over automatically from the first derivative control to velocity squared correction, or vice versa, when the deviation becomes large or small as the case may be, I use a predetermined ratio of unbalance of restoring motor control elements. These restoring motor control elements are, for example, opposed motor fields, or opposed hydraulic means. This method of automatic switching makes for a positive, snap-like switch-over as distinguished from a chatter, trembling, slow transition.

My entire system of control eliminates the intricacy of second derivative elements, and particularly as applied in my preferred embodiment, makes a rugged, reliable unit sufficiently compact and simple to construct, install and maintain without great expense and without requiring the aid of high-skilled technicians.

Figures 1, 2, 4:
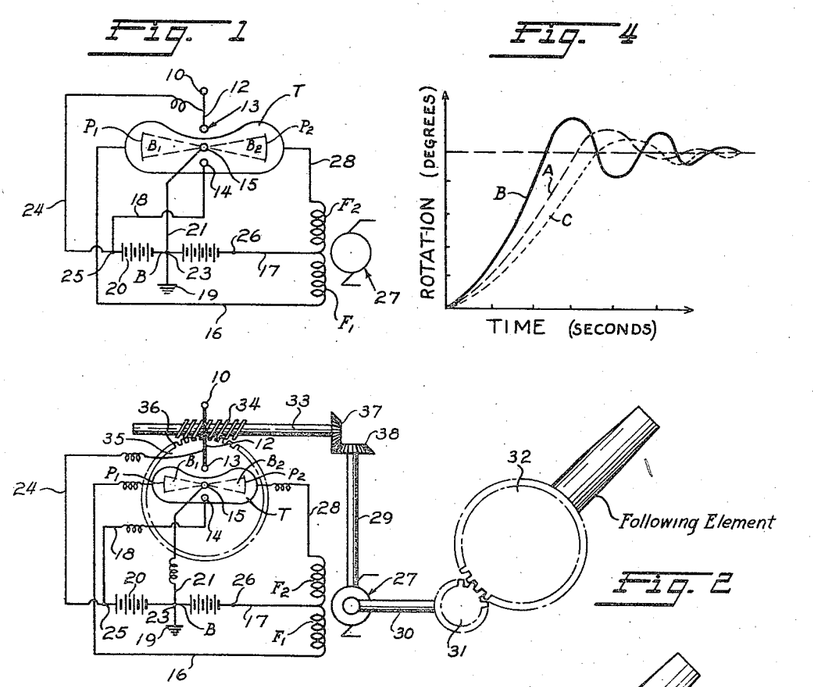
Figure 1 diagrammatically illustrates a preferred basic control circuit for the following unit of my invention.
Figure 2 illustrates a motor-driven centralizing device for the control mechanism of Figure 1.
Figure 4 gives a graphic comparison of the operation of certain control devices described hereinafter.

As illustrative of the practice of my invention, attention is directed to Fig. 1 of the drawings, wherein an embodiment of the basic directioning unit of my invention is illustrated diagrammatically. A cathode ray tube T is energized from a battery B, and the tube, in turn, energizes field windings F1 and F2 of following unit motor 27. An instrument pointer or indicating element 12 operated in any desired manner, is mounted pivotally at point 10. Electrode 13, formed at the lower end of indicating element 12, is adjacent to the mid-exterior surface of cathode ray tube T and is free to rotate about point 10 in a clockwise or counterclockwise direction. The electrode 13 is connected by lead 24 to negative terminal 25 of battery B. A fixed electrode 14 is positioned within tube T substantially at the longitudinal midpoint of the tube and is connected by lead 18 to negative terminal of battery B so as to carry the same potential as electrode 13. Cathode 15, located within tube T between and in alignment with electrodes 13 and 14, is connected by lead 21 to the midpoint 23 of battery B and grounded at 19.

There are two anode plates, P1 and P2 mounted respectively at opposite ends of and within tube T at points substantially equidistant from cathode 15. A circuit is traced from midpoint 23 of battery B, lead 21 to cathode 15, across tube T to anode plate P2, lead 28, across motor field winding F2 of the following unit and lead 17 to positive terminal 26 of battery B. A second circuit is traced from midpoint 23 of battery B, lead 21 to cathode 15, across tube T to anode plate P1, lead 16, across motor field winding F1 of the following unit and lead 17 to positive terminal 26 of battery B.

In the present embodiment of my invention, I apply the principle that cathode rays are repelled or deflected by external charges of negative electricity. This principle is employed more particularly in controlling the driving of motor 27 of the following unit. Cathode beams or rays B1, B2, passing from cathode 15 to plates P1 and P2, respectively, are controlled by electrodes 13 and 14 charged with the same high potential negative electricity. Normally the instrument pointer or indicating element 12, carrying electrode 13, rests at central position, at which position, cathode 15 and electrodes 13 and 14 are in alignment. Upon the indicating element 12 being at central position, electron beams B1 and B2 come equally into focus upon plates P1 and P2, respectively. This is understood more clearly by observing that cathode 15 is connected through lead 21 and midpoint of battery B to ground at 19. Electron beams B1 and B2 of equal intensity pass from cathode 15 to anode plates P1 and P2, respectively. Current flows in the circuit traced from anode plate P2, through lead 28, field winding F2 and lead 17 to positive terminal 26 of battery B. At the same time, a substantially equal current flows in the circuit traced from plate P1 through lead 16, across motor field winding F1, and lead 17 to positive terminal 26 of battery B. Thus the opposed windings F1 and F2, forming the field motor 27 of the following unit, carry equal currents since they are in the plate circuits of tube T, and there is no current differential to drive following unit motor 27.

When negative electrode 13 is moved to the right of central position by counterclockwise rotation of indicating element 12 about point 10, electron beam B2 is repelled by electrode 13 and part of the beam no longer strikes plate P2. Current flowing in the circuit traced from plate P2 through lead 28, field winding F2 and lead 17 to battery B, accordingly, is decreased. Meanwhile, electron beam B1 still is focused in its substantial entirety upon plate P1 with the result that current flowing through the circuit defined by lead 16, field winding F1 and lead 17 to battery B, is greater than the current flowing through winding F2 in circuit with plate P2. A current differential therefore exists between the two opposed windings F1 and F2 and motor 27 is energized by this differential. It should be noted at this point that when indicating element 12 moves on the right side of central position, the distance of electrode 13 from center and the downward deflection of beam B2 from anode plate P2 by electrode 13, increase in direct proportion. It is to be noted further that current flowing through field winding F2, or the circuit of plate P2, and the distance of electrode 13 from central position, on the right side of central position, increase in inverse order, until, of course, all of beam B2 is deflected from plate P2. Since electron beam B1 substantially is unaffected by any movement of electrode 13 to the right, plate current in the circuit of plate P1 and field winding F1 remains substantially constant. It follows, then, that for movement of the indicating element 12 on the right side of central position, the distance of electrode 13 from central position representing the magnitude of deviation between the indicating element and the following unit, the unbalance of the currents in field windings F1 and F2, and the velocity of motor 27 of the following unit, all increase in direct proportion.

On the other hand, when electrode 13 moves to the left side of central position, plate current in the circuit of plate P2 and field winding F2 remains substantially constant. Until all of beam B1 is deflected below plate P1 by electrode 13, the current flowing through F1 increases inversely as the displacement distance of electrode 13 to the left of central position; it follows, therefore, that as displacement of electrode 13 to the left of central position increases, current unbalance in the windings F1 and F2 and the speed of the motor 27 of the following unit both increase proportionately.

Movement of indicating element 12 to the right of central position causes a greater current to flow through winding F1 than in F2. On the other hand, deflection of indicating element 12 to the left of central position causes a predominating current to flow through winding F2. Accordingly, it can be seen that driving motor 27 reverses when the indicating element crosses central position. The reversible driving motor is of sufficient horsepower to position the following unit as indicated by the signal or current differential created by the deflection of indicating element 12. For training large turrets, which requires more than several horsepower, reversible motor 27 could be adapted to control a motor of much greater power, as, for example, through a relay system, to position the turret correctly.

The above description details one essential element of my invention and is a device for producing a speed of the following unit driving motor proportional to the deviation. I prefer the above embodiment, but others known in the art may be used.

In addition to the above element, I incorporate an element which stops the following unit driving motor, and thus the following unit, when the deviation has reached zero. One embodiment of this is as follows: It is to be observed from Fig. 1 that where indicating element 12 moves away from central position, driving motor 27 is driven by the unbalanced currents coursing through field windings F1 and F2. Movement of the indicating element 12 toward central position retards the following unit motor and the motor stops when central position is reached. In order to stop the following unit motor when the deviation between following unit and indicating element 12 has reached zero, reset mechanism is provided as illustrated in Fig. 2. My basic following unit control circuit described with reference to Fig. 1, also is employed in the control mechanism illustrated in Fig. 2. In addition, driving motor 27 drives a following element through shaft 30, gear 31 and gear 32, at a velocity in fixed ratio to motor velocity. A reset disc 35 to which cathode ray tube T is affixed, is driven by the motor 27 through shaft 29, bevelled gear 38 mounted on shaft 29, bevelled gear 37 mounted on worm shaft 33, worm shaft 33, worm gear 34 and gear teeth 36 or disc 35.

In operation, assume that indicating element 12 moves to a signal position on the left side of its central position, thereby creating a deviation between the following unit and the indicating element. Electron beam B1 is deflected downward an amount proportionate to the displacement of the indicating element or to the deviation of the following unit. Current flowing in the plate circuit traced from anode plate P1, through lead 16 across winding F1, and lead 17 to positive terminal 26 of battery B, accordingly is decreased. Meanwhile electron beam B2 remains in substantially full focus upon anode plate P2 and a predominating current flows in the plate circuit traced from P2 through lead 28, across winding F2 and lead 17 to positive terminal 26 of battery B. The unbalanced currents flowing in the plate circuits of plates P1 and P2 cause following unit motor 27 to drive reset disc 35. As following unit motor 27 continues to drive, reset disc 35 and cathode ray tube T rotate at a decreasing rate in a counterclockwise direction; thus, electrode 14 and cathode 15 are rotated gradually toward central position, that is, to alignment with electrode 13 on indicating element 12. The following unit motor also drives the following unit so as to overcome the deviation existing between the following unit and indicating element 12. By rotating the electron tube T, the effect of electrode 13 on beam B1 gradually decreases with the result that more and more of electron beam B1 falls into focus upon plate P1. Since electron beam B2 remains substantially in complete focus upon plate P2 throughout the counterclockwise rotation of reset disc 35, the current in the circuit of plate P2 and winding F2 remains high and substantially constant. On the other hand, current flowing in the circuit of plate P1 and following unit motor field winding F1 gradually increases with the rotation of reset disc 35 and the unbalance of currents flowing through windings F1 and F2 diminishes slowly until an actual balance of currents is obtained and following unit motor 27 comes to rest. It can be seen, therefore, that currents through field windings F1 and F2 tend more and more to balance as the deviation of the following unit from the indicating element 12 decreases. Currents in field windings F1 and F2 approach balanced condition as deviation between indicating element and following unit decreases. It follows, then, that motor velocity is proportional to the deviation and decreases proportionately with the deviation.

After the following unit has come to rest from the last signal, assume now that indicating element 12 and electrode 13 are moved to the right of central position with respect to cathode ray tube T. Electron beam B2 is deflected downward an amount proportionate to the displacement of electrode 13 from central position. Current flowing in the circuit defined by plate P2, lead 28, winding F2 and lead 17 to battery B, accordingly is decreased. Movement of electrode 13 to the right has little effect upon electron beam B1 which, therefore, remains in focus fully upon anode plate P1. The current flowing in the circuit defined by plate P1, lead 16, winding F1, and lead 17 to battery B, remains high and substantially constant. A predominating current, therefore, flows in the circuit of plate P2, and winding F1, and following unit motor 27 starts driving in an opposite direction as compared to the direction of response of the motor to a current unbalance set up by movement of electrode 13 to the left of central position. At the same time, motor 27 begins driving reset disc 35 and cathode ray tube T in a clockwise direction and electrode 14 and cathode 15 slowly approach alignment with electrode 13. The deflecting effect of electrode 13 upon electron beam B2 slowly diminishes, and as this occurs, beam B2 rises slowly, coming more and more into focus upon anode plate P2. Current through the circuit of plate P2, including following unit motor field winding F2, gradually increases and finally comes into balance with current flowing through winding F1, in the circuit of plate P1, when the tube T reaches central position with respect to electrode 13. Since balanced plate currents coursing through windings F1 and F2 leave no differential of current to drive the following unit motor 27, the following unit, therefore, comes to rest. Again it must be observed that currents through field windings F1 and F2 tend more and more to balance as the deviation of the following unit from indicating element 12 decreases. As before, currents and field windings F1 and F2 linearly approach balanced condition as deviation between indicating element and following unit decreases. It follows once more that motor speed decreases proportionately with the deviation.

With the reversible basic motor control circuit and reset mechanism described hereinbefore, displacement of indicating element 12 from central position in either direction decreases with proper rotation of cathode ray tube T and the speed of the following unit also decreases. The motor 27 acordingly, is eased to a halt as cathode ray tube T is rotated to central position with respect to indicating element 12.

As plate currents in F1 and F2 become balanced, it is possible that inertia gained by the following unit while driven to signal position, at a velocity in ratio to motor velocity, by motor 27, will cause reset disc 35 and tube T to rotate beyond signal position. When this occurs, tube T is rotated beyond central position with respect to indicating element 12. Currents in windings F1 and F2, accordingly, become unbalanced by overshooting of the following unit, and the following unit motor 27 reverses in response to the overshooting. As a result, the following unit oscillates or hunts about the point where it should come to rest.

Figure 3:
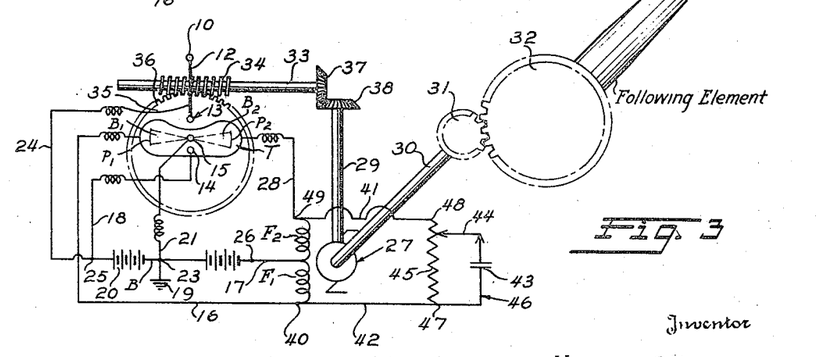
Figure 3 illustrates first time derivative of deviation following unit damping mechanism in circuit with the apparatus of Figure 2.

In short, I have described above embodiments of a speed-proportional-to deviation device, and a reset device, to stop the motor at deviation zero. Other embodiments may be used. But both these elements may not be enough under given operating conditions. Therefore, I apply in addition, a first derivative correction, one novel embodiment of which is as follows: Referring now more particularly to Fig. 3, it will be noted that I connect a variable resistance 45 across tube plates PI and P2 and across field windings F1 and F2 of the following unit motor 27. These connections are traced from plate PI across lead 16 up to junction 40 of winding F1, thence over leads 42 and 46, across variable resistance 45, lead 41 to junction 49 of winding F2 and lead 28 to plate P2. I connect condenser 43 across resistance 45, which connection is traced from point 47, lead 46, condenser 43, selector 44 to resistance 48.

Now it must be noted that the distance of indicating element 12 from central position and the differential of voltage across the circuits of plates PI and P2 vary in direct proportion. Moreover, the rate at which the position of indicating element 12 changes with respect to central position, thus the rate of change of deviation between the following unit and indicating element 12, and the rate at which voltage changes across the circuits of plates PI and P2, all vary in direct proportion. Current through condenser 43, therefore, is proportional directly to the rate of voltage change between the plate circuits PI and P2 and therefore also is proportional to the rate of change of deviation between the following unit and the indicating element 12.

To illustrate how the following unit motor 27 is damped by the correction current discharged by condenser 43, assume that indicating element 12 is deflected to the left of central position. Electron beam B1 in part is repelled from plate PI by negative electrode 13, and current decreases in the plate circuit of plate PI. Current in the plate circuit of plate P2 remains substantially unaffected by deflection of electron beam B1. Therefore, more current flows in field winding F2 than in winding F1 and following unit motor 27 begins driving the following mechanism, in proportion to the deflection of indicating element 12, that is, in proportion to the deviation of the following unit. Reset disc 35 and tube T are driven in a counterclockwise direction by motor 27 and the deviation of the following unit from indicating element 12 gradually decreases, as described more fully with reference to Fig. 2. Meanwhile, current discharges from the circuit of plate P2 across condenser 43 and resistance 45, into the circuit of plate PI and the unbalance of currents flowing through field windings F1 and F2, accordingly, decreases. It must be remembered that the correction current flowing across condenser 43 is high when indicating element 12 is first moved to left position, and the following unit, reset disc 35 and tube T are moving toward signal position at high velocity. The applied correction current is proportional to the rate of change of deviation between the following unit and the indicating element. As reset disc 35 and tube T are driven by motor 27 to central position with respect to indicating element 12, the speed of motor 27, as described with reference to Fig. 2, decreases, and the correction current across condenser 43, accordingly, decreases, but this correction current, nevertheless remains proportional to the deviation. It must be understood that discharge of condenser 43 reverses when indicating element 12 is deflected to the right of central position. In any event, whether indicating element 12 moves to the right or left of central position, the correction current flowing across condenser 43 is applied in proportion to the rate of change of deviation in anticipation of the following unit overshooting signalled position.

The manner in which such over-run correction current prevents hunting of the following unit is illustrated in Fig. 4, wherein rotation of the following unit is plotted in the ordinate against a time of rotation abscissa. Curve A represents following unit approach to a given signal position of indicating element 12, when my damping current correction proportional to the rate of change of deviation is applied to one of the following unit motor windings F1 and F2. Curve B shows the manner in which a following unit control system having no correction current permits hunting of the following unit about a fixed signal position. Curve B, therefore, represents the operation of such apparatus as is disclosed in Fig. 2 where no overshooting correction is applied and the speed of the following unit motor is proportional to the deviation between following unit and indicating element. Curve C illustrates following unit approach to signalled position when a motor control system comprising complicated superimposed first and second derivative motor damping means is employed.

The variable resistance element 45 permits ready adjustment of the correction current draining through condenser 43 and thus, my control device can be regulated to ensure well-damped, asymptotic approach of the following unit to signalled position under different types of working conditions.

Now, where following unit control mechanism is needed for controlling a following unit responding to predominantly small signals at low velocity, particularly where friction and other factors prevent constant acceleration of the following unit, a correction of the first derivative type just described, is adequate to produce well-damped approach of the following unit to signalled position. When larger signals, and consequently, larger velocities of the following unit are encountered, or when the following unit is heavy, large amounts of energy are stored in the unit. Such energy must be attenuated for the following unit to have a well-damped approach to signal position. On the other hand, for practical purposes, friction in the controlled elements is negligible at such velocities and acceleration relatively is constant. I find, therefore, where the deviations are large, that an overshoot anticipation correction applied to the following unit motor in proportion to the square of following unit velocity gives a more nearly asymptotic approach of the following unit to signalled position. One embodiment of my invention, in accordance with this principle, is illustrated in Fig. 5 of the drawings.

Figure 5:
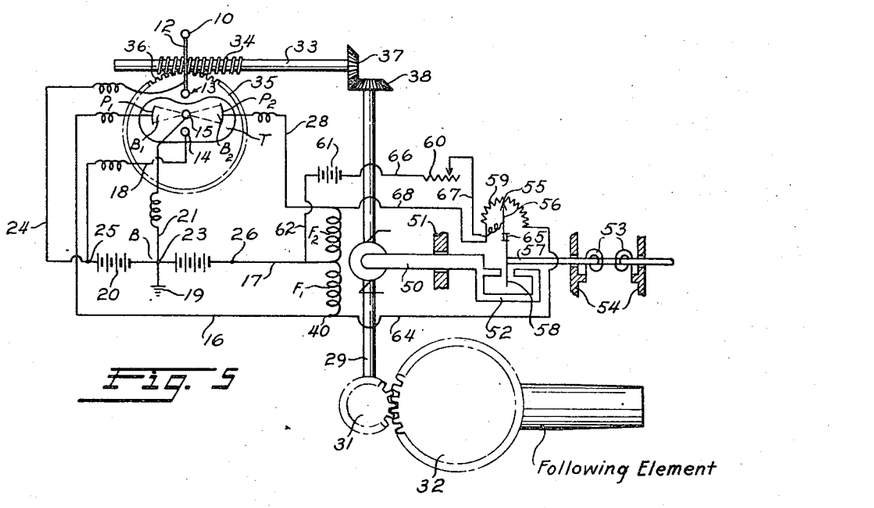
Figure 5 illustrates velocity squared damping mechanism applied to the apparatus of Figure 2.

It will be noted in Fig. 5, that my basic following unit motor control circuit and reset mechanism described more particularly with reference to Fig. 2, are shown in combination with overshooting control apparatus. My overshooting control apparatus is provided with a shaft 50 extending from following unit motor 27 which shaft is mounted in bearing 51. At the end of shaft 50, remote from motor 27, is mounted a watt-meter type magnet 52. A shaft 57 supported in bearings 54 extends coaxially from shaft 50. Disc 58 is secured to the end of shaft 57 and is free to revolve in the gap of magnet 52. Meter-type coil springs are attached to shaft 57 and to bearings 54 to retard rotation of disc 58 in either direction. Upon driving the following unit as described more particularly with reference to Fig. 2 of the drawings, shaft 50 and magnet 52 rotate in ratio with the following unit motor. Magnet 52 exerts a drag upon the conducting disc 58, and the disc, accordingly, revolves an angular distance proportional to the velocity of following unit motor 27.

Rotary-type variable resistor 59, wound according to a square-law or current square taper, has a contact arm 56 fastened to disc 58 at point 65. Field windings F1 and F2 of motor 27 are connected across variable resistor 59. One circuit is traced from battery 61, over lead 62, lead 17, across field winding F1, lead 64, resistor 59, contact arm 56, lead 67, variable resistor 60 and lead 66 back to battery 61. Another circuit is traced from battery 61, over lead 62, across field winding F2, lead 68, across variable resistor 59, contact arm 56, lead 67, variable resistor 60 and lead 66 back to battery 61.

While following unit motor 27 is at rest, contact arm 56 remains at position 55 on the variable resistor 59, and equal, but opposed currents flow from battery 61 through resistor 59 and field windings F1 and F2.

Upon indicating element 12 being deflected to the left of central position, a predominating current flows in the circuit of plate P2 and field winding F2, as described more particularly hereinbefore. Motor 27 drives at a velocity proportional to the displacement of indicating element 12 from central position, that is, proportional to the deviation between indicating element 12 and the following unit. At the same time, reset disc 35 and tube T are driven in a counterclockwise direction through gearing 36 and 34, shaft 33, gearing 37 and 38 and shaft 29 by following unit motor 27. The velocity at which the reset mechanism is driven by motor 27 also is proportional to following unit deviation or to the displacement of indicating element 12 from central position. Consequently, as the reset mechanism is driven toward central or neutral position, the velocity of the following unit decreases.

With the initial movement of indicating element 12 to left of central position, following unit motor 27 starts driving shaft 50 and magnet 52 at a velocity in proportion to the signal. Magnet 52 exerts a drag upon disc 58, and the disc along with shaft 57 and contact arm 56 rotate in proportion to magnet speed. Contact arm 56 is displaced, in the proper direction, from its neutral position 55 to vary the resistance across resistor 59. Resistance to the current flowing from battery 61 across field winding F1, accordingly, is decreased. The potential of plates P1 and P2 across windings F1 and F2, therefore, decreases and this results in a decrease in current driving following unit motor 27.

It must be recalled that velocity of following unit motor 27 and thus the velocity of the motor driven following element are reduced primarily by reset disc 35 and cathode ray tube T being driven in a counterclockwise direction toward central position with respect to indicating element 12. As following unit motor velocity is decreased by the reset mechanism, the energy correction current coursing from battery 61 across variable resistor 59 and field winding F1 also decreases. This decrease of correction current occurs because the resistance across resistor 59 increases in direct proportion with decreasing following unit motor velocity. Since resistor 59 has a square law current taper, the current flowing across it to field winding F1 varies in direct proportion to the square of the velocity of the following unit motor. The ratio of current to velocity is varied by adjustment of variable resistor 60.

It is to be understood clearly, therefore, that velocity of the motor and thus that of the ratio driven following element are decreased gradually by a slow balancing of plate currents is the circuits of plates P1 and P2. This is accomplished by the reset mechanism of which the motor and reset disc 35 are parts. The motor stops when central position of the reset mechanism is reached. Throughout the period of gradual decrease or increase of following unit motor velocity, a correction current is applied across resistor 59 to one of field windings F1 and F2, to prevent the following unit from overrunning signalled position. This correction current varies in direct proportion with the square of following unit velocity, and is applied to decrease unbalance of currents between windings F1 and F2 in accordance with a velocity square law, until the following unit motor comes to a well-damped rest, at which time there is once more a complete balance of currents in the field windings of the motor. When indicating element 12 is moved to the right of central position, it will, of course, be understood that my apparatus functions in a fashion similar to that just outlined, except that motor 27 reverses and the correction current is applied through resistor 59 across field winding F2.

Figure 6:
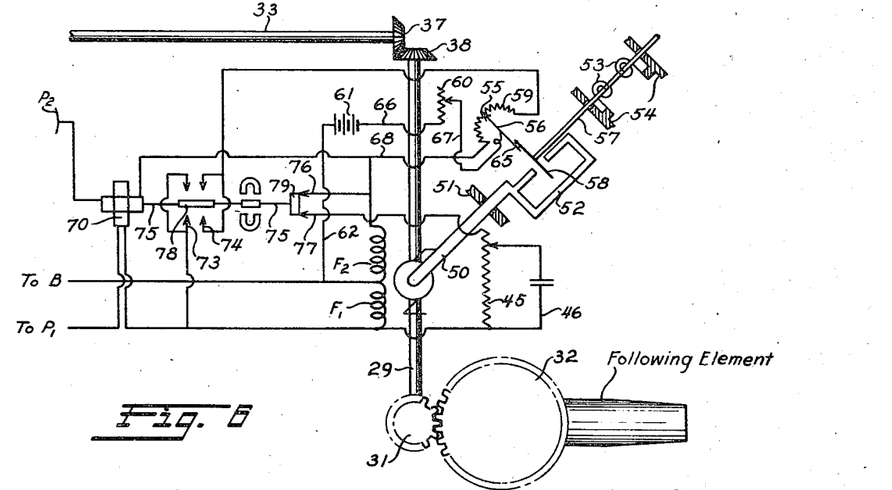
Figure 6 illustrates selector mechanism applied to the combined damping mechanisms of Figs. 3 and 5.

Fig. 6 of the drawings illustrates following unit control apparatus comprising a combination of the two following unit overshoot-preventing control systems more specifically described hereinbefore. As the following unit motor responds to large signals, I prefer to use a motor control system of the type illustrated in Fig. 5, with which an overshoot anticipation correction is applied in ratio to and directly proportional to following unit velocity squared. When the following unit motor responds to small signals, I prefer to employ a motor control system of the type more specifically described with reference to Fig. 3, wherein an overshoot anticipating correction current proportional to the rate of change of deviation between the following unit and indicating element 12 is applied to the following unit motor. For detailed operation of the respective mechanisms, reference is made more particularly to the previous description herein of Figs. 3 and 5.

In accordance with the present embodiment of my invention, I connect an electrical quotient meter 70 across plates P1 and P2 of a cathode ray tube of the type described hereinbefore. The electrical quotient meter 70 operates on the ratio of the two plate currents of plates P1 and P2. A spring-restrained indicator shaft 75 driven by meter 70 carries switch elements 78 and 79. When following unit motor 27 is not operating, or when a small potential exists across field windings F1 and F2 of this motor, switch element 79 closes the circuit across contacts 76, 77 and a motor overshoot anticipating system of the type described with reference to Fig. 3, is brought into operation. Therefore when the motor is operated by a small current differential, a correction current, proportional to the rate of change of deviation between the following unit and indicating element 12, therefore, is applied to one of the field windings F1, F2 of following unit motor 27.

Assume, now, that indicating element 12 is moved from central or neutral position so as to produce a predetermined degree of unbalance in the circuits of plates P1 and P2. Assume, further, that the ratio of unbalanced plate currents, or the power ratio of these currents, exceeds a predetermined amount, requiring that the following unit be driven more than 2½°, for example, by the following unit motor to reduce following unit deviation to zero. Meter 70 turns spring-restrained shaft 75 in one direction or the other, depending upon which plate circuit of plates P1 and P2 carries the lowest current. Switch element 78 closes either a circuit across contacts 71, 72 or a circuit across contacts 73, 74 to bring into operation following unit overshoot preventing apparatus of the velocity-squared type described more particularly with reference to Fig. 5. At the same time, switch element 79 is rotated away from contacts 76 and 77, cutting out the following unit overshoot preventing system which applies a correction current proportional to the rate of change of deviation between the following unit and indicating element 12, to one of the field windings F1, F2 of motor 27. As reset mechanism and the following unit of the type described in Figs. 2 and 5 are driven toward central position or signalled position, it will be noted, by particular reference to the description of Figs. 2 and 5, that velocity of the following unit motor 27, and the velocity of the following element which is in ratio to motor velocity, accordingly, decrease in direct proportion to the magnitude of the deviation. A damping current, however, is applied to reduce motor field current unbalance in proportion to the square of the motor or following unit velocity, as described more particularly with reference to Fig. 5. When signal current differential of the plates P1 and P2 decreases to the predetermined amount or ratio, as, for example, when following unit deviation is reduced to the predetermined deviation of 2½°, spring-loaded shaft 75 overcomes the torque exerted by meter 70 and switch element 78 rotates away from contacts 71, 72 or contacts 73, 74, as the case may be, cutting out the motor overshoot preventing system of the velocity-squared type. Meanwhile, switch element 79 closes a circuit across contacts 76, 77 and the overshoot preventing system described more particularly with reference to Fig. 3, functioning in direct proportion to the rate of change of following unit deviation comes into operation. Therefore, a refined correction current proportional to the rate of change of deviation is applied to one of the field windings F1 and F2, until following unit motor 27 and the following unit are brought to a well-damped stop by the reset mechanism and basic control circuit, more particularly described with reference to Figs. 1 and 2.

I find that the basic control system of my invention, one embodiment of which is illustrated in Fig. 2 of the drawings, is mechanically simple and economical to construct. The system is highly sensitive to movement of the signalling or indicating element giving a signal which varies accurately in direct proportion to the deviation of the following unit from the indicating element. It is to be understood quite clearly that the unbalanced currents flowing across my cathode ray tube system may be applied in numerous ways to drive the following unit motor, the opposed motor fields described herein being one illustration. Instead of driving the following unit motor directly, it is to be further understood that the unbalanced plate currents may be used to operate a relay system for controlling larger currents or a larger motor.

Either my following unit control system which operates in proportion to the rate of change of following unit deviation, or my system which operates in proportion to the square of the following unit velocity, may be used separately with good results under certain circumstances. Moreover, a following unit motor overshoot preventing system comprising a first time derivative of deviation control means and a velocity square control means for applying corrections to the following unit motor, with means for switching automatically from one of these controls to the other, has a wide range of application in the remote control art. With the latter combination, overshooting of signalled position by the following unit is prevented whether the following unit is heavy or light, or whether the velocity of the following unit is high or low.

It is to be understood quite clearly that my basic control or intermediate control system is not limited to an electrical device. Mechanical, or hydraulic means, for example, may be employed to control following unit motor speed in proportion to the deviation existing between the following unit and the indicating element. Moreover, other mechanism, including mechanical or hydraulic means, for example, may be employed to apply the first derivative of deviation correction, or the velocity-square correction to the following unit in order to maintain overshooting and hunting at a minimum. Where the first time derivative of deviation correction and the velocity-square correction are applied in sequence, automatic switchover from one correction to the other may be accomplished by apparatus which responds to a particular power limit or to a particular ratio or unbalance of power driving the following unit. The switchover apparatus may be of mechanical, electrical or hydraulic type, for example, without departing from the spirit of my invention.

My invention has valuable application also to control systems for controlling process conditions, such as temperature, salinity and the like. For these applications, a pyrometer pointer, salinity meter pointer or the like serves as the indicating element. The following unit is a recorder motor or just a motor alone, made powerful enough to drive a low-inertia valve for controlling the flow of medium to restore a desired process condition. The deviation of the motor from desired process condition, accordingly, is reduced automatically to zero. The motor provided is so powerful that its inertia is the predominant characteristic to be controlled rather than the negligible inertia of the valve. By applying my principle of first time derivative of deviation motor control and switching automatically to velocity squared correction on large deviations, a desired process condition will be approached asymptotically, as in controlling a mount, without overshoot or hunting. This is particularly valuable in processes where large batches of material are dumped into the process suddenly. Say, for example, a batch of cold milk is dumped into a pasteurizing tank. A sudden fluctuation in controlled temperature condition occurs, and the regulator, when coupled with a pasteurizing tank thermometer and a steam heat supply valve of the tank, gives an asymptotic restoration of tank temperature to desired value. Similarly, good results are achieved when my control system is employed for controlling conditions such as humidity, pressure, liquid, level, rate of flow of fluids or electricity, voltage, frequency and the like.

As many possible embodiments may be made of my invention and as many changes may be made in the embodiment hereinbefore set forth, it is to be understood that all matter described herein or shown in the accompanying drawings, is to be interpreted as illustrative and not in a limiting sense.

I claim:

1. A control system of the class described, comprising, in combination, an indicating element adapted to be moved to produce a deviation between it and a following unit, the latter having as an element thereof a driving motor for reducing deviation of said unit from said indicating element, means for energizing said driving motor, means for maintaining the velocity of said driving motor proportional to the magnitude of the deviation between the following unit and said indicator, means for applying a correction to the driving motor proportional to motor velocity-squared to reduce following unit energy and means for applying a first time derivative of deviation correction to the driving motor to reduce the energy of the motor when said deviation decreases to a small amount.

2. A control system of the class described, comprising, in combination, an indicating element adapted to be moved to produce a deviation between it and a following unit, the latter having as an element thereof a driving motor for reducing deviation of said unit from said indicating element, means for energizing said driving motor, means for maintaining the velocity of the driving motor proportional to the magnitude of the deviation of the following unit from said indicator, means for applying a correction to the driving motor proportional to motor velocity-squared to reduce following unit velocity, means for applying a first time derivative of deviation correction to the driving motor to reduce the velocity of the motor when said deviation decreases to a small amount, and automatic means for switching from one correction applying means to the other.

3. A control system of the class described, comprising, in combination, an indicating element adapted to be moved to produce a deviation between it and a following unit, the latter having as an element thereof a reversible driving motor for reducing deviation of said unit from said indicating element, means for energizing said driving motor, unbalanced power means for maintaining the velocity of the driving motor proportional to the magnitude of the deviation of the following unit from said indicator, means for applying a correction to the driving motor proportional to motor velocity squared to reduce following unit energy, means for applying a first time derivative of deviation correction to the driving motor to reduce the velocity of the motor when said deviation decreases to a small amount, and automatic switching means operated by said unbalanced power means to switch out one of said correction applying means and to switch on the other thereof.

4. A control system of the class described, comprising, in combination, an indicating element adapted to be moved to produce a deviation between it and a following unit, the latter having as an element thereof a driving motor for reducing deviation of said unit from said indicating element, opposed energizing means which when unbalanced drives said motor, means for producing a degree of unbalance between said opposed energizing means proportional to the magnitude of the deviation, means driven by said driving motor for stopping the motor at zero deviation, means for applying a correction to the driving motor proportional to motor velocity squared to reduce following unit energy; means for applying a first time derivative of deviation correction to the driving motor to reduce the motor velocity, when said deviation decreases to a small amount, and automatic switching means associated with said opposed energizing means to switch out one of the correction applying means and to switch on the other thereof.

5. A control system of the type described, comprising, in combination, an indicating element adapted to be moved to produce a deviation between it and a following unit, the latter having as an element thereof a driving motor for reducing deviation of said unit from said indicating element, two opposed motor fields for the driving motor, means for producing a degree of unbalance between said motor fields proportional to the magnitude of the deviation, means driven by said driving motor for stopping the motor at zero deviation, means for applying a correction to the driving motor proportional to motor velocity squared to reduce following unit energy; means for applying a first time derivative of deviation correction to the driving motor to reduce the motor velocity when said deviation decreases to a small amount, and automatic switching means associated with said unbalance producing means to switch out one of the correction applying means and to switch on the other thereof.

6. A control system of the class described, comprising, in combination, an indicating element adapted to be moved to produce a deviation between it and a following unit, the latter having as an element thereof a driving motor for reducing at a decreasing rate deviation of said unit from said indicating element, two opposed motor fields for driving the motor, means for maintaining a degree of unbalance of currents across said motor fields proportional to the magnitude of the deviation, means driven by said driving motor for stopping the motor, means connected across said unbalanced motor fields for supplying an anticipating correction current to the driving motor in proportion to the rate of change of deviation; means associated with said motor fields for supplying a correction current to the driving motor proportional to the square of driving motor velocity, switch means associated with each of said correction current supplying means, and a current ratio meter operating on the ratio of unbalanced motor field currents for so actuating said switch means that one of said correction current supplying means is switched on and the other switched off upon the departure of unbalanced currents from a predetermined ratio.

7. A control system of the type described, comprising, in combination, an indicating element adapted to be moved to produce a deviation between it and a following unit, the latter having as an element thereof a driving motor for reducing deviation of said following unit from said displaceable indicating element; field windings for said driving motor; an electron tube having two anode plates connected across said driving motor field windings; a cathode disposed adjacent to said electron tube anode plates; a source of energy so connected to the anode plates and tube cathode that an electron beam flows between said cathode and each of the anode plates; said displaceable indicating element being so connected to the source of energy and so disposed adjacent to said tube cathode that upon displacement, the indicating element deflects one of the electron beams causing a motor energizing plate current differential across said driving motor field windings proportional to the deviation between the following unit and indicating element.

8. A control system of the type described, comprising, in combination, an indicating element adapted to be moved to produce a deviation between it and a following unit, the latter having as an element thereof a driving motor for reducing deviation of said following unit from said displaceable indicating element; field windings for said driving motor; a rotatably mounted electron tube connected in driven relationship with the driving motor and having two anode plates connected across said driving motor field windings, a cathode disposed adjacent to said electron tube anode plates, a source of energy so connected to the anode plates and tube cathode that an electron beam flows between said cathode and each of the anode plates, said displaceable indicating element being so connected to the source of energy and so disposed adjacent to said tube cathode that upon displacement the indicating element deflects one of the electron beams causing a motor energizing plate current differential across said driving motor field windings proportional to the deviation between the following unit and indicating element.

9. A control system of the type described, comprising, in combination, an indicating element adapted to be moved to produce a deviation between it and a following unit, the latter having as an element thereof a driving motor for reducing deviation of said unit from said displaceable indicating element, field windings for said driving motor, an electron tube having two anode plates connected across said driving motor field windings, a cathode disposed adjacent to said electron tube anode plates, a source of energy so connected to the anode plates and tube cathode that an electron beam flows between said cathode and each of the anode plates, said indicating element being connected to the source of energy and so disposed adjacent to said tube cathode that upon displacement the indicating element deflects one of the electron beams causing a motor energizing plate current differential across said motor field windings proportional to the deviation between the following unit and indicating element; and a condenser leakage circuit connected across said tube anode plates for decreasing the plate current differential in proportion to the rate of change of said deviation.

10. A control system of the type described, comprising, in combination, an indicating element adapted to be moved to produce a deviation between it and a following unit, the latter having as an element thereof a driving motor for reducing deviation of said unit from said displaceable indicating element; field windings for said driving motor; an electron tube having two anode plates connected across said driving motor field windings, a cathode disposed adjacent to said electron tube anode plates, a source of energy so connected to the anode plates and tube cathode that an electron beam flows between said cathode and each of the anode plates, a displaceable indicating element connected to the source of energy and so disposed adjacent to said tube cathode that upon displacement said indicating element deflects one of the electron beams causing a plate current differential proportional to the deviation between the following unit and indicating element across said driving motor field windings whereby the driving motor is energized in proportion to said deviation; and a square law variable resistance circuit connected across said tube anode plates for decreasing following unit energy when plate current differential exceeds a predetermined amount.

11. A control system of the type described comprising an indicating element adapted to be moved to produce a deviation between it and a following unit, the latter having as an element thereof a driving motor for reducing deviation of said unit from said displaceable indicating element, field windings for said driving motor, a control circuit for supplying balanced currents across said driving motor field windings, a displaceable indicating element for unbalancing in proportion to the deviation between the following unit and the indicating element the currents flowing through said driving motor field windings thereby causing energization of said driving motor in direct proportion to deviation between the following unit and said indicating element, a leakage circuit connected across said driving motor field windings for decreasing the unbalance of field currents in proportion to the rate of change of deviation of the following unit, a square law variable current resistance circuit connected across said driving motor field windings for decreasing the unbalance of field currents in proportion to the square of following unit velocity, switch means in each of said current unbalance decreasing circuits, and selector means for opening one of said switches and closing the other.

12. A control system of the type described, comprising, in combination, an indicating element adapted to be moved to produce a deviation between it and a following unit, the latter having as an element thereof a driving motor for reducing deviation of said unit from said displaceable indicating element, field windings for said driving motor, an electron tube having two anode plates connected across said driving motor field windings, a cathode disposed between said electron tube anode plates, a source of energy so connected to the anode plates and tube cathode that an electron beam flows between said cathode and each of the anode plates, a displaceable indicating element connected to the source of energy and so disposed adjacent to said tube cathode that upon displacement said indicating element deflects one of the electron beams causing a motor energizing plate current differential proportional to the deviation between the following unit and indicating element across said driving motor field windings, proportional to deviation between the following unit and said indicating element, a leakage circuit connected across said tube anode plates for decreasing the unbalance of plate currents in proportion to the rate of change of deviation of the following unit, a square law variable current resistance circuit connected across said tube anode plates for decreasing the unbalance of plate currents in proportion to the square of following unit velocity and switch means in each of said current unbalance decreasing circuits and selector means for opening one of said switches and closing the other.

HYMAN OLKEN.